United States Patent
Fan et al.

(10) Patent No.: US 7,480,817 B2
(45) Date of Patent: Jan. 20, 2009

(54) METHOD FOR REPLICATING DATA BASED ON PROBABILITY OF CONCURRENT FAILURE

(75) Inventors: Jinliang Fan, Redmond, WA (US);
Zhen Liu, Tarrytown, NY (US);
Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/395,018

(22) Filed: Mar. 31, 2006

(65) Prior Publication Data
US 2007/0234102 A1 Oct. 4, 2007

(51) Int. Cl.
*G06F 11/00* (2006.01)
(52) U.S. Cl. .................. 714/4; 714/6; 370/238
(58) Field of Classification Search .............. 714/4, 714/6
See application file for complete search history.

(56) References Cited

U.S. PATENT DOCUMENTS

| | | | |
|---|---|---|---|
| 5,806,075 A | 9/1998 | Jain et al. | |
| 6,163,856 A | 12/2000 | Dion et al. | |
| 6,335,937 B1 | 1/2002 | Chao et al. | |
| 6,411,991 B1 | 6/2002 | Helmer et al. | |
| 6,496,941 B1 | 12/2002 | Segal et al. | |
| 7,107,274 B2 * | 9/2006 | Sekiguchi et al. | 707/100 |
| 7,167,359 B2 * | 1/2007 | Wendel et al. | 361/685 |
| 2005/0168934 A1 * | 8/2005 | Wendel et al. | 361/685 |
| 2007/0035880 A1 * | 2/2007 | Hall et al. | 360/137 |
| 2007/0168336 A1 * | 7/2007 | Ransil et al. | 707/3 |
| 2007/0234102 A1 * | 10/2007 | Fan et al. | 714/4 |
| 2008/0198752 A1 * | 8/2008 | Fan et al. | 370/238 |

OTHER PUBLICATIONS

L. Rizzo, "Effective Erasure Codes for Reliable Computer Communication Protocols," *SIGCOMM Comput. Commun. Rev.*, vol. 27, No. 2, pp. 1-13 (1997).

Bakkaloglu, et al., "Modeling Correlated Failures in Survivable Storage Systems," *Fast Abstract at IEEE International Conference on Dependable Systems & Networks*, pp. 1-2(2002).

Weatherspoon, et al., "Introspective Failure Analysis: Avoiding Correlated Failures in Peer-to-Peer Systems," *21st IEEE Symposium on Reliable Distributed Systems (SRDS'02)*, pp. 1-6 (Oct. 2002).

(Continued)

*Primary Examiner*—Emerson C Puente
(74) *Attorney, Agent, or Firm*—Kevin M. Jordan; Stephen Bongini; Fleit Gibbons Gutman Bongini & Bianco P.L.

(57) ABSTRACT

A method is provided for replicating data. All nodes coupled to a source node via a network are surveyed to determine candidate replication nodes, and coordinates for each candidate replication node are acquired. The coordinates are used to determine a geographic location of and a communication cost for each candidate replication node. Each geographic location is rated based on probability of a concurrent failure of the source node and the candidate replication node, and a branch-and-bound algorithm is used to assign values to sets of candidate replication nodes based on the communication costs and the ratings. One set of candidate replication nodes is selected based on the assigned values. The data is replicated on the nodes of the selected set of candidate replication nodes, and all nodes coupled to the source node via the network are at least periodically monitored to determine availability of new nodes.

1 Claim, 6 Drawing Sheets

OTHER PUBLICATIONS

Bhagwan, et al., "Total Recall: System Support for Automated Availability Management," *First ACM/Usenix Symposium on Networked Systems Design and Implementation* (*NSDI*), pp. 1-14 (2004).

Nicola, "Modeling of Correlated Failures and Community Error Recovery in Multiversion Software", *IEEE Transactions on Software Engineering*, vol. 16, No. 3, Mar. 1990, 10 pp.

* cited by examiner

METHOD FOR REPLICATING DATA BASED ON PROBABILITY OF CONCURRENT FAILURE

STATEMENT REGARDING FEDERALLY SPONSORED RESEARCH OR DEVELOPMENT

This invention was made with Government support under Contract No.: TIAH98230-04-3-0001 awarded by the U.S. Department of Defense. The Government has certain rights in this invention.

BACKGROUND OF THE INVENTION

1. Field of the Invention

This invention relates in general to information replication, and more particularly to selection of information replication locations based on a low probability of catastrophic concurrent failures and communication costs.

2. Description of the Related Art

Reliable backup of data is an important aspect of any computing system where loss of data would be detrimental to the system. For a backup system to be effective, at least one replica of the data should survive a failure, or data-destroying event, so that data can be recovered. Such failures may happen as a result of catastrophic events (such as terrorist attacks), extreme weather phenomena, large-scale network failures, power blackouts, and other similar events. To survive such events, data should be replicated on nodes that are unlikely to be affected by concurrent failures (i.e., failures affecting multiple system nodes simultaneously.)

Currently employed solutions replicate data either on nodes that are close to the data source (for example within the same LAN or building site) or on remote, geographically diverse sites. The use of replicas in close proximity to the data source results in low replication cost but does not provide the required geographic diversity to survive catastrophic failures that may affect an entire geographic area. Conversely, while replication on remote sites may provide higher resiliency to catastrophes, large distances between data storage locations results in high cost (such as equipment, infrastructure, and communication).

Recently, methods that replicate content across multiple nodes have been proposed, particularly in the context of peer-to-peer networks. A common characteristic in peer-to-peer based solutions is that they select a random set of nodes (peers) where the content is placed, without any consideration for the geographic distance, communication cost, or delay between these nodes. The nodes where data replication is performed could be located very far away (e.g., across countries or continents). So, while selection of a random set of nodes to replicate data using these methods could be used to survive catastrophic events, it is likely to incur very high communication costs and delays, and thus is not a dependably efficient method of replicating data.

Existing solutions for achieving data availability do not jointly consider resiliency and communication cost. Furthermore, none of these solutions consider the impact of multiple, concurrent failures which may be caused by catastrophic events. A new solution that addresses both of these issues is therefore required.

What is needed is a solution that achieves desired levels of data availability in disaster recovery while considering jointly the resiliency requirements and replication costs. Furthermore, a solution is needed that factors in an impact and probability of multiple, concurrent failures which may be caused by catastrophic events.

SUMMARY OF THE INVENTION

Briefly, in accordance with the present invention, disclosed is a computer-implemented method for selecting replication nodes in a network of geographically distributed data storage nodes. In one embodiment, the method includes determining at least two eligible nodes in the network of nodes, determining a communication cost for each of the eligible nodes, determining a probability of a concurrent failure of the source node and each of the eligible nodes, and then selecting at least one of the eligible nodes for replication of data located on the source node based on determined communication costs and probabilities of concurrent failure.

In an embodiment of the present invention, the communication cost is determined by factoring a physical distance between the eligible nodes, an electrical pathway distance, a number of switches between nodes, an electrical pathway signal carrying capacity of the lines, or a combination thereof.

In one embodiment of the present invention, the eligible node is selected because it has the lowest combined value of communication cost and probability of a concurrent failure. Once the eligible node is selected data located on the source node is replicated on the one or more selected nodes.

The node replicating system includes a source node with a data storage area and at least two replication nodes that are coupled to the source node via a network interface. The system also includes a processor coupled to the source node. The processor determines a probability of a concurrent failure of the source node and each of the replication nodes and a communication cost of communicating data from the source node to each replication nodes. The processor then selects, based on the determined communication costs and probabilities at least one of the replication nodes for replicating data contained in the data storage area of the source node.

In one embodiment of the present invention statistical records of previous events are factored into the probability of a concurrent failure of the source node and each of the replication nodes.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

It should be understood that the embodiments described below are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

Embodiments of the present invention optimize the availability of replicated data by jointly considering a probability of catastrophic concurrent failures and replication cost. The system is operable across a large set of nodes, in both a fully distributed and a centralized manner. Each node (data source) on which the system is deployed makes decisions about where to replicate the data it is generating (collecting, processing, etc.). These decisions are based on a probability of the source and replication location(s) being simultaneously damaged by a single event, related events, or concurrent events. These events include power outages, network failures, computer viruses, and catastrophes, such as hurricanes, earthquakes, tsunamis, terrorist acts, and others. The replication location determination is also based on one or more metrics that factor communication costs involved in replicating the data in a location that is a determined distance away from the source node.

Figure 1:
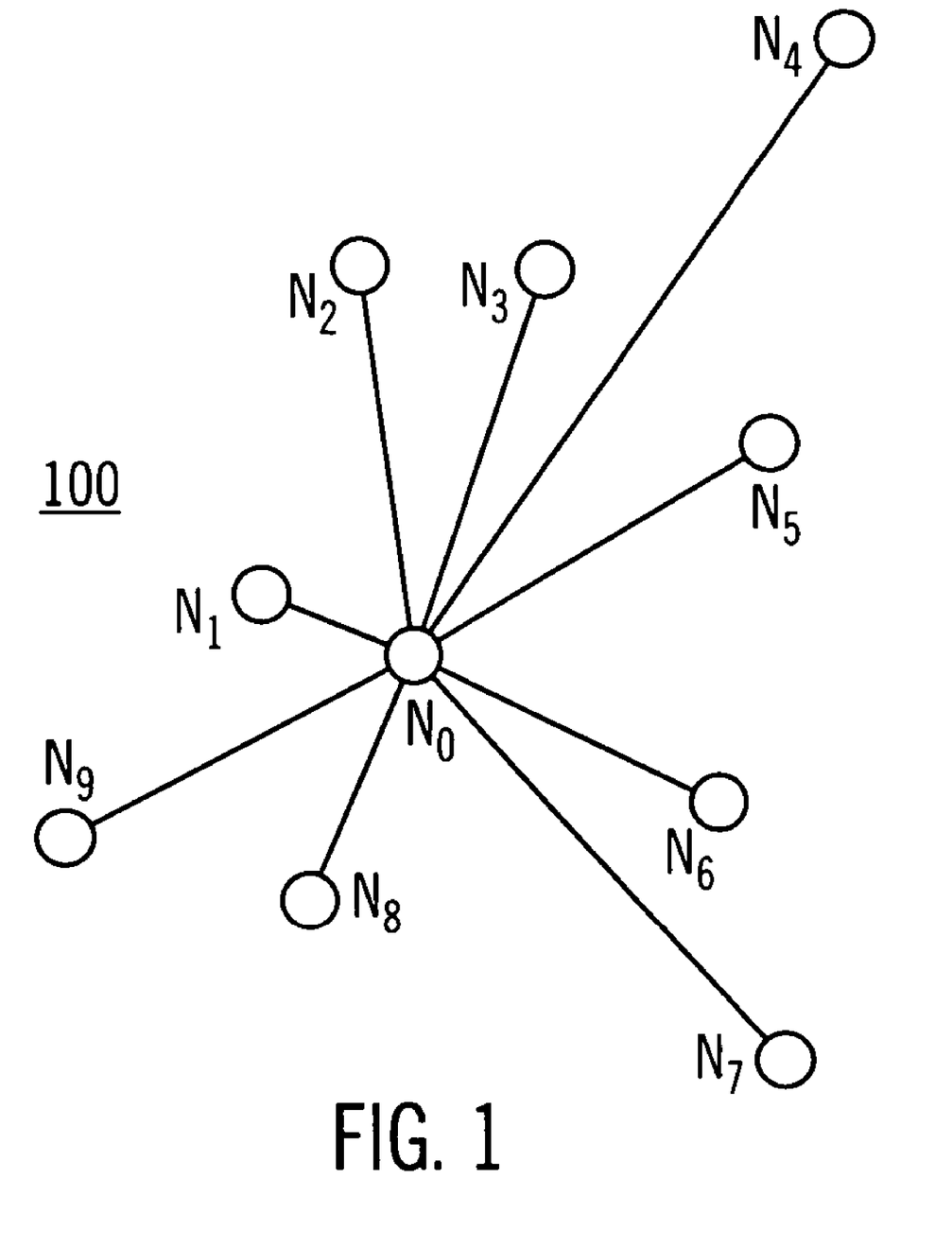
FIG. 1 is a diagram illustrating a network of nodes interconnected by pairs of bi-directional communication links, according to the present invention.

Described now is an exemplary embodiment of the present invention. FIG. 1 shows a network 100 of nodes $N_0$-$N_9$, each interconnected by bidirectional communication links. In the example shown, node $N_0$ is the "source" node and nodes $N_1$-$N_9$ are destination nodes, which are also known as "candidate replication" nodes that are communicatively coupled to the source node $N_0$, i.e., nodes that are candidates for replicating data from node $N_0$. In further embodiments, the number of candidate replication nodes can be any number. Multi-node network 100 is asymmetrical and manifests different communication parameters. Specifically, different data path lengths exist between certain source and destination nodes. Data path lengths may be calculated as a physical distance and/or an electrical distance. For instance, two nodes can be in the same room; however the distance an electrical signal must travel to reach from one to the other may be enormous. In addition to path lengths, the connection from one node to another may vary in the number of switches in the electrical pathway, each having an inherent delay associated with it. Furthermore, a bandwidth, or electrical signal carrying capacity, may vary from node to node. Furthermore, the cost of establishing a connection to a candidate replication node via a service provider may vary from node to node.

Figure 2:
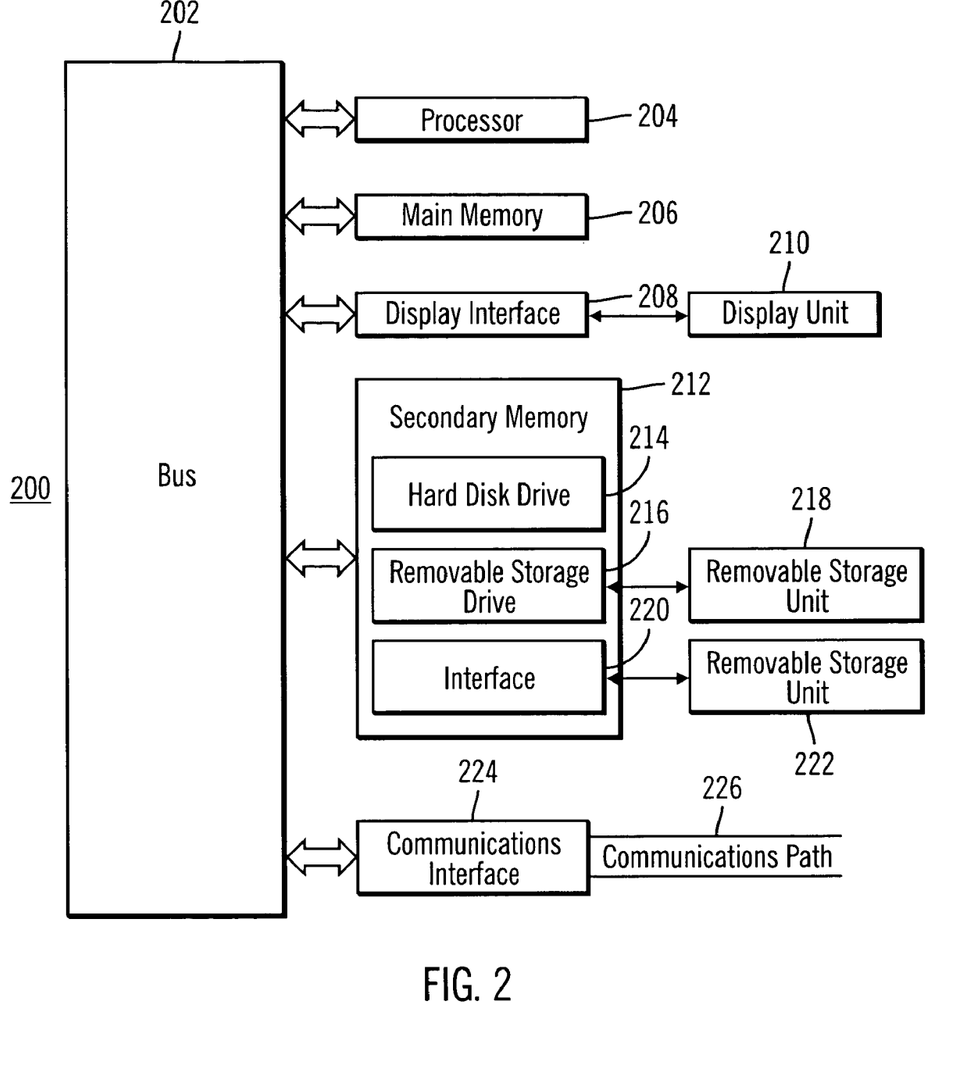
FIG. 2 is a high-level block diagram showing an exemplary node of FIG. 1.

FIG. 2 is a high-level block diagram showing an exemplary node 200. The node includes one or more processors, such as processor 204. The processor 204 is connected to a communication infrastructure 202 (e.g., a communications bus, cross-over bar, or network). After reading this description, it will become apparent to a person of ordinary skill in the relevant art(s) how to implement the invention using other nodes, computer systems, and/or computer architectures.

The node 200 includes a display interface 208 that forwards graphics, text, and other data from the communication infrastructure 202 (or from a frame buffer not shown) for display on a display unit 210. The node also includes a main memory 206, preferably random access memory (RAM), and also includes a secondary memory 212. The secondary memory 212 includes, for example, a hard disk drive 214 and/or a removable storage drive 216, representing a floppy disk drive, a magnetic tape drive, an optical disk drive, etc. The removable storage drive 216 reads from and/or writes to a removable storage unit 218 in a well known manner. Removable storage unit 218 represents a floppy disk, a compact disc, magnetic tape, optical disk, etc. which is read by and written to by removable storage drive 216. As will be appreciated, the removable storage unit 218 includes a computer readable medium having stored therein computer software and/or data.

In alternative embodiments, the secondary memory 212 includes other similar means for allowing computer programs or other instructions and data to be loaded into the computer system. Such means include, for example, a removable storage unit 222 and an interface 220. Examples of such include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to the computer system.

The node also includes a communications interface 224. Communications interface 224 allows software and data to be transferred between the node and other nodes on a network or to external devices. Examples of communications interface 224 include a modem, a network interface (such as an Ethernet card), a communications port, a PCMCIA slot and card, etc. Software and data transferred via communications interface 224 are in the form of signals which may be electronic, electromagnetic, optical, or other signals capable of being received by communications interface 224. These signals are provided to communications interface 224 via a communications path (i.e., channel) 226. This channel 226 carries signals and may be implemented using wire or cable, fiber optics, a phone line, a cellular phone link, an RF link, and/or other communications channels.

In embodiments of the present invention, the source node replicates its data on a subset of destination nodes for resiliency purposes. For each destination node, a set of coordinates are known and are obtained from, for instance, a location service, such as GPS, or estimated using delay-based network measurements such as Global Network Positioning [GNP], or other available methods. If a set of coordinates cannot be obtained, a set of distances between the nodes can be used. The nodes can be distributed across a large geographic area.

Embodiments of the present invention allow the source node $N_0$ to determine an optimum set of nodes for the placement of its replicated data. In one embodiment of the present invention, optimality is determined by factoring the probability of data being available at any time on a candidate node and minimized replication cost. Replication cost can be defined in a variety of ways, depending on the particular disaster recovery policy and cost structure. It may include communication cost, which is a function of the distance between the source node and its replicating nodes, storage cost, infrastructure cost, etc. Communication cost can be given by any function that increases with the number of nodes and distance of these nodes from the source node $N_0$. Availability is expressed as the probability that at least one node replicating the data survives at any time.

Exemplary causes of concurrent failures that cause both the source node and a replication node to become simultaneously unavailable are extreme weather phenomena, such as tornadoes, hurricanes, earthquakes, tsunamis, etc., destructive catastrophic events, such as acts of terrorism or accidents, network failures, computer viruses, power failures, and other similar causes.

Figure 3:
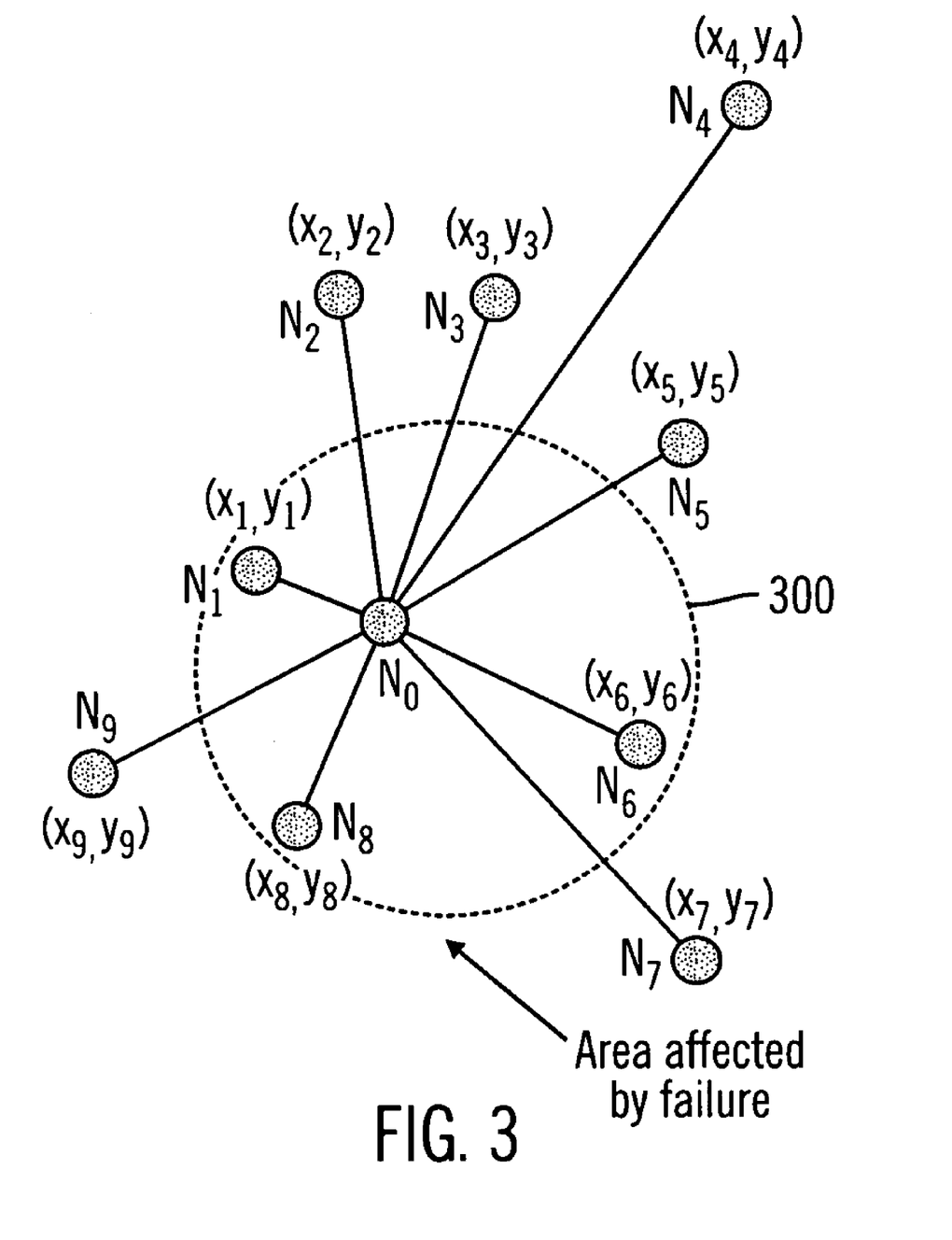
FIG. 3 is a diagram showing the network of FIG. 1 after suffering an exemplary concurrent failure of multiple nodes.

As an example of availability, FIG. 3 shows the network of FIG. 1, after it has suffered an exemplary concurrent failure 300, which in the example impacts nodes within a circular shape. The failure 300 impacts the set of nodes $N_0$, $N_1$, $N_6$ and $N_8$ and renders them unusable. If data has been replicated in any or several of the remaining nodes $N_2$-$N_5$, $N_7$, or $N_9$, the data can be recovered and the effects of the catastrophic failure are reduced.

Figure 4:
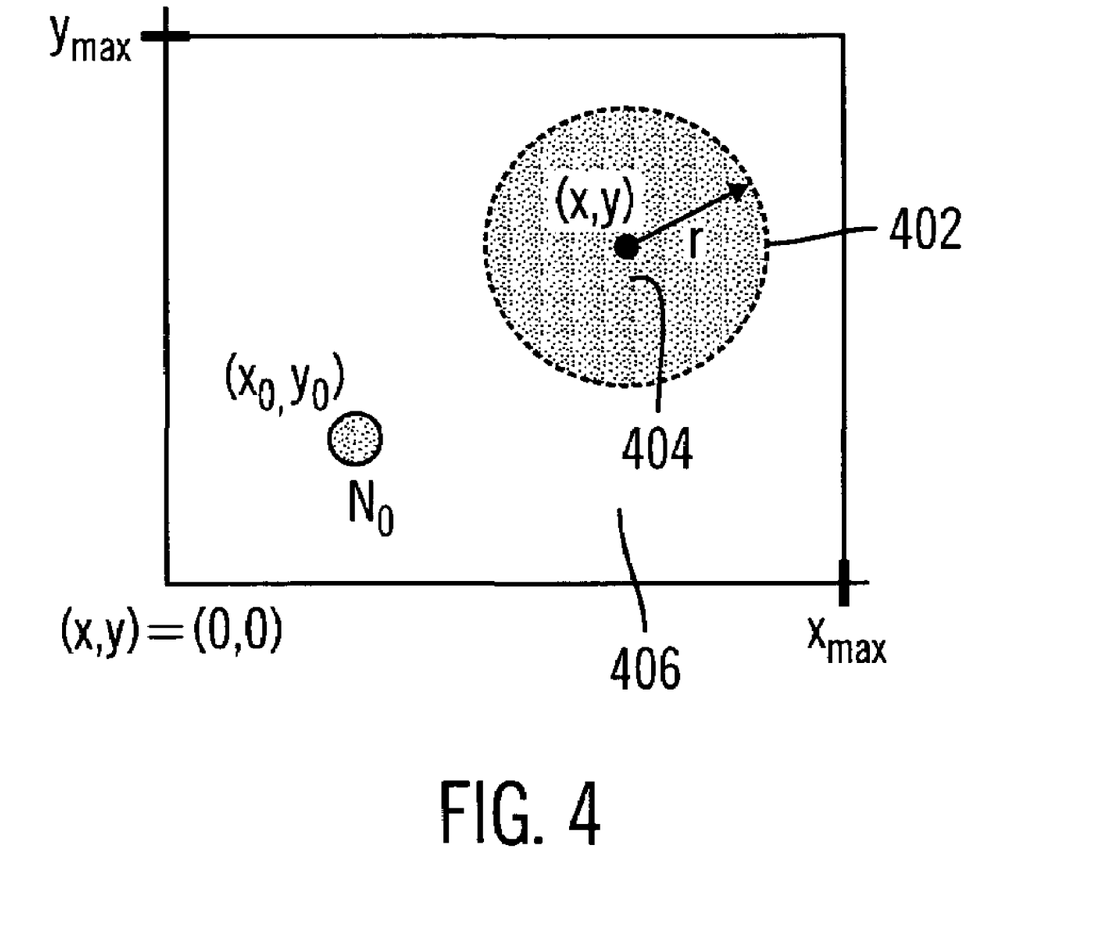
FIG. 4 is a diagram illustrating a correlated failure model according to an embodiment of the present invention.

Preferred embodiments of the present invention construct a model of correlated failures to compute this probability. The model uses historical data as well as predictive mathematical models. In one exemplary embodiment of the present invention shown in FIG. 4, a correlated failure model 400 assumes that a failure impacts a set of nodes within a circle 402, the center 404 of which is uniformly distributed within a 2-dimensional plane 406 and the radius of which follows an exponential distribution that may or may not affect the source node $N_0$. In another exemplary embodiment, a correlated failure model 400 assumes that a failure impacts a set of nodes within a circle 402, the center of which is distributed within a 2-dimensional plane with a distribution that is obtained from historical data, including but not limited to, earthquake frequency maps, hurricane frequency maps, flood zone maps, snow-storm frequency maps as well as a combination thereof, and the radius of which is also obtained from an exponential distribution for which the rate is obtained from the previously mentioned maps. Preferred embodiments of the present invention also construct a model of the combination of independent and correlated failures to compute this probability.

For example, the model of the combination of independent and correlated failures to compute the failure probability can be constructed as follows. The model assumes that failures happen in time and that time is slotted. The length of a time slot is defined so that the probability that in each time slot, the probability that one correlated fault occurs is $P_{corr}$ and the probability that more than one such fault occurs within a single timeslot is negligible. As described above, $P_{corr}$ can be computed from historical data as well as predictive mathematical models. We assume that the center of the fault event is distributed according to a uniform random distribution over a circular fault field with radius R on the 2-dimensional plane. For simplicity of presentation, we use the center of the circular fault field as the origin of the 2-dimension space and adjust all coordinates accordingly. To characterize the phenomenon that fault events affecting large geographic areas are much rarer than those affecting small geographic areas, we assume the impact of a fault event is exponentially decaying: the impact reaches as far as a distance r from the center of the fault, where r is random and exponentially distributed with parameter c; when a fault happens, all sensors within a radius of r to the center of the fault fail simultaneously.

When a fault event occurs at center v, all sensors in a set S will fail due to this correlated fault if and only if their maximum distance to v is equal or less than the radius of the fault. That is, the probability that they all fail due to this fault event is $$F_{corr}(S, u) = \int_{r=d(S,u)}^{+\infty} ce^{-cr} dr = e^{-cd(S,u)}, \quad (1)$$

where $d(S,u) = \max_{N_i \in S} d(N_i, u)$. So if the probability of independent failures is zero, the probability that all nodes in S fail at the same time slot is the integral of equation (1) over all possible fault centers in the fault field, that is:

$$F_{corr}(S) = \frac{P_{corr}}{\pi R^2} \int_u F_{corr}(S, u) du, \quad (2)$$

In the case that the center of the fault event is not distributed according to a uniform random distribution, but instead a distribution $P_{corr}(u)$, equation (2) is written as:

$$F_{corr}(S) = \int F_{corr}(S, u) P_{corr}(u) du, \quad (3)$$

When both independent and correlated failures are possible, the failure of a set of nodes during the same time slot can be the result of various combinations of independent failures and correlated failures (e.g., part of the nodes in the set fail independently and the other nodes within the set fail due to a correlated failure.) To compute this probability, we first consider the conditional probability that all nodes in a set S fail in a time slot given that a fault has happened in that time slot with the fault center at u. To calculate this conditional probability, we consider separately the cases where the radius of the fault covers 1 node, 2 nodes, . . . , or all nodes in S. Assume that the sensors in S have been sorted based on their distances from u and that they are denoted by $N_{i1}$, $N_{i2}$, . . . ,$N_{i|S|}$ in increasing order. In this case, we have:

$$F_{comb}(S) = Prob\{r \geq d(N_{i_{|S|}}, u\} + \sum_{s=1}^{|S|} Prob\{r \in [d(N_{i_{|s|-1}}, u), d(N_{i_{|s|}}, u)]\} \prod_{k=s}^{|S|} Prob\{N_{i_k}, \text{fails}\},$$

where we set $d(N_{i0}, v) = 0$.

That is, $$F_{comb}(S, u) = e^{-cd(N_{i_{|S|}}, u)} + \sum_{s=1}^{|S|} \left(e^{-cd(N_{i_{S-1}}, u)} - e^{-cd(N_{i_S}, u)}\right) P_{ind}^{|S|-s+1}.$$

Therefore the probability that all nodes in S fail in the same time slot is, $$F_{comb}(S) = (1 - P_{corr}) P_{ind}^{|S|} + \frac{P_{corr}}{\pi R^2} \int_u F_{comb}(S, u) du.$$

This integral can be computed using numerical methods. The availability of data generated by a node $N_A$ in a time slot is thus defined as the probability that either $N_A$ or at least one of the sensors in its backup set $S_A$ survives the risk of both independent failures and geographically correlated failures through the time slot. That is, the availability, denoted by $A(N_A Y S_A) = 1 - F_{comb}(N_A Y S_A)$.

Replicating on a small set of nodes and/or nodes that are close to the source node incurs a low replication cost, but also suffers from low availability. Conversely, replicating on a large set of nodes and/or nodes that are geographically distributed—located far from the source node—incurs large replication cost but also achieves high availability. Embodiments of the present invention determine an optimal combination of replica nodes, in terms of number of nodes and their location. This is done by looking at a plurality of communication parameters to determine a communication cost. The parameters include factors, such as physical distances, electrical path lengths and other electrical pathway factors between nodes. For instance, although a replication node may be physically separated a larger distance away from the source node than other available replication nodes, the electrical path length to that replication node may be the shortest, thus giving the pair the lowest communication cost. The parameters also include factors, such as the cost of establishing a connection to a node via a service providers' network and the cost of data storage on the node.

In addition to path lengths, the connection from one node to another may vary in the number of switches in the electrical pathway, each having an inherent delay associated with it. Furthermore, a bandwidth, or electrical signal carrying capacity, may vary from node to node. Also, a node's memory capacity for storing data can be a factor. If the node has only enough capacity to store a portion of the data, the cost of communicating the remaining data to other nodes should be factored into the overall communication cost.

The set of candidates can be very large and include any combination of nodes among the nodes reachable by the source node. Preferred embodiments of the present invention narrow the search space to determine the optimal set of replicating nodes by applying a "branch-and-bound" algorithm to deal with the combinatorial explosion among all possible node sets. This begins with an initial set of candidate nodes $(N_1, \ldots, N_k)$, which can be derived arbitrarily, e.g., by limiting the maximum distance from the source node, or through some discovery/directory service. Each candidate set of nodes is examined against a requirement for the solution. In one embodiment of the present invention the requirement is to satisfy a given availability or probability that all data produced at a node will be available, for example 0.99999. In such an embodiment, the optimal set is the one that satisfies the availability requirement while exhibiting the lowest replication cost. In another embodiment of the present invention, the requirement from each set of candidate nodes is to have a replication cost below a certain budget. In this embodiment, the optimal set is the one that satisfies the budget requirement, while maximizing the availability. The "branch-and-bound" algorithm considers the possible sets of nodes as follows: first, it considers the solutions that include the singleton sets $\{N_1\}, \ldots, \{N_k\}$. For each solution, the availability and replication cost is computed. Other candidate nodes are added to each possible solution set, creating a new candidate set and expanding into a tree-like structure.

At each stage, the "branch-and-bound" algorithm considers whether the candidate sets satisfy the given requirements. In the embodiment where the requirement is to satisfy a given availability, if the availability of a given solution set satisfies the requirement no further expansion of this branch is needed, since the addition of another node will result in an unnecessary increase in cost. If a branch that does not satisfy availability has a higher communication cost than one that does, it is disregarded and not pursued further. When no further branches can be constructed, the lowest cost solution is selected from among the remaining solution sets that satisfy the availability requirement.

The branch and bound algorithm can be expressed in pseudo-code as follows:

1:  $S_0 = \{N_0\}$
2:  $S_{full} = S_0 \cup \{N_1, N_2 \ldots, N_k\}$

-continued

3:  set the root of tree T to $S_0$
4:  let cost upper bound $C_u = +\infty$
5:  let $S_{optimal}$ = null
6:  while T ≠ ø do
7:      randomly choose a tree-node $S_{curr}$ from tree T
8:      if $S_{curr}.cost \geq C_u$ then
9:          delete from tree T the subtree rooted at $S_{curr}$
10:     else if $S_{curr}.availability \geq A_l$ then
11:         let $C_u = S_{curr}.cost$
12:         let $S_{optimal} = S_{curr}$
13:         delete from tree T all nodes whose costs are equal or greater then $C_u$
14:     else if $S_{curr}$ is expandable then
15:         Branch out a new child $S_{new}$ below $S_{curr}$ in tree T, where $S_{new}$ belongs to $[S_{curr} \cup \{N_i\} \mid N_i \in S_{full} - S_{curr}\}$. Once $S_{curr}$ has already branched out all its $|S_{full} - S_{curr}|$ children, it is not expandable anymore.
16:     else if all $S_{curr}$'s children have been deleted then
17:         delete $S_{curr}$ from tree T
18:     end if
19: end while
20: Algorithm exits. If $S_{optimal}$ is null, then there is no feasible backup set that can achieve availability $A_l$; otherwise, $S_{optimal} - \{N_0\}$ is the optimal backup set.

Figure 6:
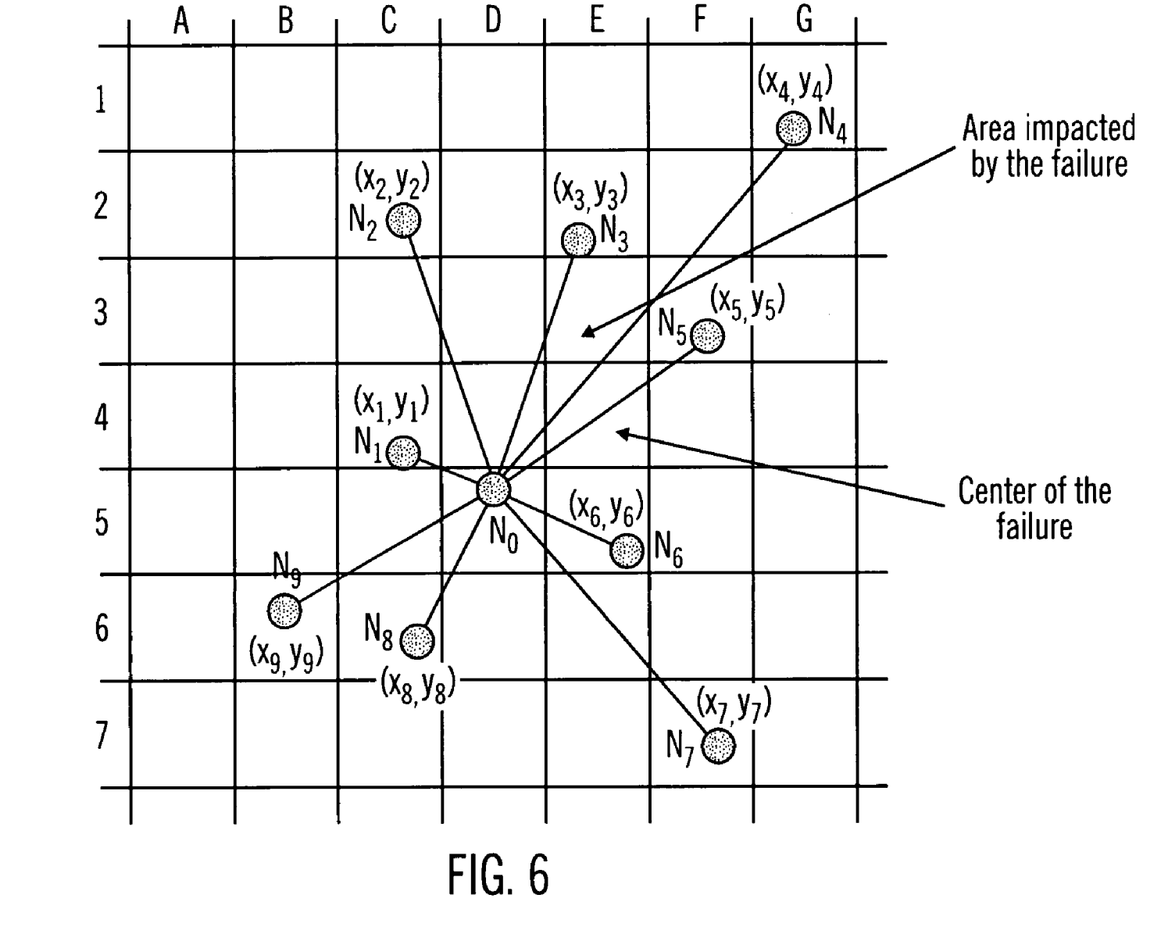
FIG. 6 is a flow diagram illustrating the steps for designating replication nodes according to one embodiment of the present invention.

In other embodiments, the system is extended to cover cases where the location of one or more nodes is not given by continuous coordinates in a multi-dimensional space, but by placement within a region or surface of the space. In this case the multidimensional space is sub-divided into a number of regions, each one of which includes one or more nodes. In this case, it can be assumed that a correlated failure will impact all nodes within on or more regions, i.e., if a node is affected then all nodes with the region of that node are also affected. The probability that two or more regions will fail simultaneously due to a correlated failure depends on the distance between the regions, measured in terms of the (discrete) number of regions between them. Similarly, the radius of a failure is given in a (discrete) number of regions affected from the center of the failure. The probability distribution for the radius may follow a geometric distribution, analogous to the exponential distribution in the continuous case discussed above. In the example embodiment of FIG. 6, the 2-Dimensional plane is subdivided in a grid-like fashion, resulting in the rectangular regions identified in the figure. The x coordinates are labeled A-G and the y coordinates are labeled 1-7. In this example, the center of the failure is region E4, the failure extends 1 region in all directions, thus, the regions affected by the failure are D3, E3, F3, D4, E4, F4, D5, E5 and F5.

Figure 5:
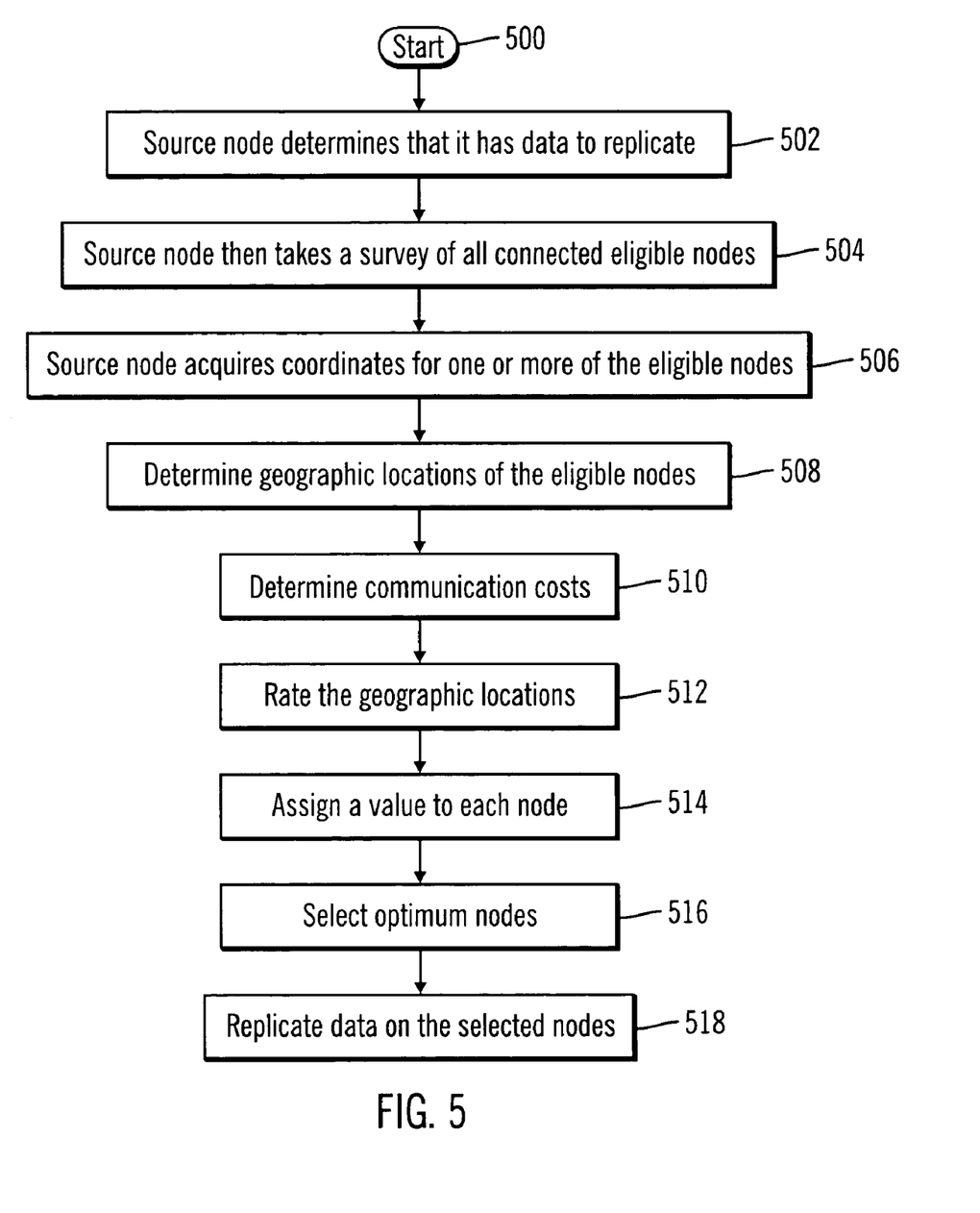
FIG. 5 is a diagram illustrating a failure distribution model according to an embodiment of the present invention.

FIG. 5 shows a process flow diagram for one embodiment of the present invention. The process begins at step 500 and moves directly to step 502 where a source node determines that it has data to replicate. The source node then takes a survey of all connected nodes to determine eligibility, in step 504. "Eligible," as used here, indicates functional, communicating nodes, with memory capacity to handle storage of at least a portion of the data intended for replication. After the eligible nodes are determined in step 504, the flow moves to step 506 where the source node acquires coordinates for, or distances to, one or more of the eligible nodes. In step 508, the coordinates are used to determine geographic locations of the eligible nodes. The coordinates or other means also allow the source node to determine communication costs associated with the required transmission distances to the other nodes. This determination is made in step 510. The geographic locations are then given ratings in step 512, the ratings being based on the probability of a catastrophic event affecting both the candidate node and the source node. The probability can be based on historical data, such as an area's previous history of hurricanes. As an example, the probability will be high if the source and the replication node are both in an area that is typically affected by hurricanes and especially an area that is affected by the same hurricanes.

In step 514, each node is assigned a value, based on a combination of communication cost and the geographic location of the candidate node. A selection is then made, in step 516, based on these assigned values. In step 518, the data is replicated on the selected node or nodes. In some embodiments, the nodes are constantly, or periodically, monitored to determine changing conditions or the availability of new nodes that are strategically better choices for replication.

While preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The terms "a" or "an," as used herein, are defined as "one or more than one." The term "plurality," as used herein, is defined as "two or more than two." The term "another," as used herein, is defined as "at least a second or more." The terms "including" and/or "having," as used herein, are defined as "comprising" (i.e., open language). The terms "program," "software application," and the like as used herein, are defined as "a sequence of instructions designed for execution on a computer system." A program, computer program, or software application typically includes a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A computer-implemented method for replicating data, the method comprising the steps of:
   determining, by a source node having a non-volatile data storage area, that the source node has data in the non-volatile data storage area to be replicated;
   surveying, by the source node, all nodes coupled to the source node via a network so as to determine candidate replication nodes, the nodes being geographically distributed data storage entities, and the candidate replication nodes being the nodes that are functional, communicating nodes with memory capacity available to store at least a portion of the data to be replicated;
   acquiring, by the source node, coordinates for each of the candidate replication nodes;
   using, by the source node, the coordinates to determine a geographic location of each of the candidate replication nodes;
   using, by the source node, the coordinates to determine a communication cost for each of the candidate replication nodes, the communication cost being determined based on communication parameters that include a physical distance, an electrical pathway distance, a number of switches in an electrical pathway, a cost of establishing a connection, and an electrical pathway signal carrying capacity;
   rating, by the source node, each of the geographic locations based on probability of a concurrent failure of the source node and the candidate replication node, the probability being based on historical data and predictive mathematical models, the historical data including statistical records of previous events, and the predictive mathematical models including a model of a combination of independent and correlated failures;
   using, by the source node, a branch-and-bound algorithm to assign values to sets of the candidate replication nodes based on a combination of the communication costs and the ratings of the geographic locations of the candidate replication nodes;
   selecting, by the source node, one of the sets of candidate replication nodes based on the values that are assigned, the one set of candidate replication nodes being selected so as to obtain a lowest value of the combination of the communication cost and the probability of a concurrent failure;
   replicating the data to be replicated on the nodes of the one set of candidate replication nodes; and
   at least periodically monitoring, by the source node, all nodes coupled to the source node via the network to determine availability of new nodes.

* * * * *